United States Patent [19]
Jacobs et al.

[11] Patent Number: 5,569,706
[45] Date of Patent: Oct. 29, 1996

[54] AQUEOUS POLYUREA DISPERSIONS WITH IMPROVED HARDNESS AND SOLVENT RESISTANCE

[75] Inventors: Patricia B. Jacobs, Pittsburgh; Kenneth P. Yonek, McMurray, both of Pa.

[73] Assignee: Bayer Corporation, Pittsburgh, Pa.

[21] Appl. No.: 458,935

[22] Filed: Jun. 2, 1995

[51] Int. Cl.$^6$ .............................. C08J 3/00; C08K 3/20; C08L 75/00; B32B 27/00

[52] U.S. Cl. .................. 524/591; 524/589; 524/590; 524/839; 524/840; 524/539; 428/423.1

[58] Field of Search .................... 524/589, 590, 524/591, 539, 839, 840; 428/423.1

[56] References Cited

U.S. PATENT DOCUMENTS

| | | | |
|---|---|---|---|
| 3,479,310 | 11/1969 | Dieterich et al. | 260/29.2 |
| 3,870,684 | 3/1975 | Witt et al. | 260/75 NH |
| 4,066,591 | 1/1978 | Scriven et al. | 260/29.2 TN |
| 4,092,286 | 5/1978 | Noll et al. | 260/29.2 TN |
| 4,108,814 | 8/1978 | Reiff et al. | 260/29.2 TN |
| 4,203,883 | 5/1980 | Hangauer, Jr. | 260/29.2 TN |
| 4,237,264 | 12/1980 | Noll et al. | 528/67 |
| 4,238,378 | 12/1980 | Markusch et al. | 260/29.2 TN |
| 4,408,008 | 10/1983 | Markusch | 524/591 |
| 4,829,122 | 5/1989 | Pedain et al. | 524/591 |
| 5,444,117 | 8/1995 | Wade et al. | 524/590 |

*Primary Examiner*—Paul R. Michl
*Assistant Examiner*—Patrick Niland
*Attorney, Agent, or Firm*—Joseph C. Gil; Thomas W. Roy

[57] ABSTRACT

The present invention relates to aqueous polyurea dispersions wherein the polyureas contain 0.1 to 25% by weight, based on the weight of the polyureas, of en-urea groups (calculated as —NH—C(O)—N—, MW 57) obtained by the reaction of an isocyanate group with an aldimine group prepared from a cyclic polyamine containing (cyclo)aliphatically bound amino groups.

The present invention also relates to a process for preparing these aqueous polyurea dispersions and to their use for preparing coatings.

22 Claims, No Drawings

AQUEOUS POLYUREA DISPERSIONS WITH IMPROVED HARDNESS AND SOLVENT RESISTANCE

BACKGROUND OF THE INVENTION

1. Field of the Invention

The present invention relates to aqueous polyurea dispersions which have improved hardness and solvent resistance due to the incorporation of aldimines into the polymer backbone, to a process for their preparation and to their use for the production of coating compositions.

2. Description of the Prior Art

The production of linear or cross-linked aqueous polyurethane-urea dispersions is known as shown by U.S. Pat. Nos. 3,479,310; 4,066,591; 4,092,286; 4,108,814; 4,237,264; and 4,238,378 which disclose linear polyurethane-ureas and U.S. Pat. Nos. 3,870,684 4,203,883 and 4,408,008, which disclose cross-linked polyurethane-ureas. The aqueous polyurethane-urea dispersions may be used for a wide range of commercial applications such as adhesives or coatings for various substrates including textile fabrics, plastic, wood, glass fibers and metals. Chemical resistance, abrasion resistance, toughness, tensile strength, elasticity and durability are among the many desirable properties of these coatings. In some cases these properties of coatings prepared from aqueous polyurethane-urea dispersions have equaled or even surpassed the performance levels of coatings obtained from solvent-based polyurethane lacquers.

Regardless of the property level which may be obtained for coatings prepared from commercial polyurethane-urea dispersions, there is always a further need to increase these properties, in particular hardness and solvent resistance.

It is an object of the present invention to provide aqueous polyurea dispersions which can be used to prepare coatings which possess improved properties, especially hardness and solvent resistance.

This object may be achieved in accordance with the present invention by preparing the aqueous polyurea dispersions by incorporating aldimines into the polymer backbone, preferably during the preparation of an NCO prepolymer.

The use of ketimines and aldimines for preparing aqueous polyurethane-urea dispersions has been disclosed in U.S. Pat. No. 4,829,122. In accordance with this patent NCO prepolymers and either aldimines or ketimines are mixed and dispersed in water. Upon contact with water the aldimines and ketimines are hydrolyzed to the corresponding amine, which then chain extends the NCO prepolymer to form the dispersed polyurethane-urea. This reference does not disclose any direct reaction between an aldimine and an NCO prepolymer and clearly does not disclose chemically incorporating an aldimine into the NCO prepolymer without hydrolysis of the aldimine.

SUMMARY OF THE INVENTION

The present invention relates to aqueous polyurea dispersions wherein the polyureas contain 0.1 to 25% by weight, based on the weight of the polyureas, of en-urea groups (calculated as —NH—C(O)—N—, MW 57) obtained by the reaction of an isocyanate group with an aldimine group prepared from a cyclic polyamine containing (cyclo)aliphatically bound amino groups.

The present invention also relates to a process for preparing these aqueous polyurea dispersions by A) preparing an NCO prepolymer by reacting an organic polyisocyanate with an aldimine and/or a high molecular weight polyol and optionally an isocyanate-reactive compound containing hydrophilic groups and B) reacting the NCO prepolymer with an aldimine or an isocyanate-reactive compound containing amino groups either prior to, during or after dispersing the NCO prepolymer in water, wherein the aldimine is present in an amount sufficient to incorporate 0.1 to 25% by weight, based on the weight of the polyurea, of en-urea groups (calculated as —NH—C(O)—N—, MW 57) obtained by the reaction of an isocyanate group with an aldimine group prepared from a cyclic polyamine containing (cyclo)aliphatically bound amino groups Finally, the present invention relates to coatings prepared from these aqueous polyurea dispersions.

DETAILED DESCRIPTION OF THE INVENTION

In accordance with the present invention the term "polyurea" means polymers containing one or more urea groups and optionally other groups such as urethane groups. The "reaction of an isocyanate group with an aldimine group" refers to the formation of an en-urea group from the reaction of an aldimine group with an isocyanate group without initially hydrolyzing the aldimine group to form an amino group. The aldimine group exists in equilibrium with an enamine group as follows:

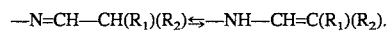

Either of these groups can react with an isocyanate group to form an en-urea group containing the structural unit

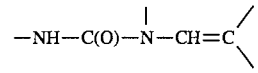

Even though it has not been confirmed and even though the present inventors do not wish to be bound by any particular theory, it appears the greater percentage of isocyanate groups react with enamine groups.

The present invention preferably relates to aqueous polyurea dispersions wherein the polyureas are based on the reaction product of a) an NCO prepolymer containing 0.1 to 25% by weight, based on the weight of the polyurea, of en-urea groups (calculated as —NH—C(O)—N—, MW 57) obtained by the reaction of an isocyanate group with an aldimine group prepared from a cyclic polyamine containing (cyclo)aliphatically bound amino groups with b) an isocyanate-reactive component containing amino groups.

The present invention also preferably relates to a process for preparing these aqueous polyurea dispersions by A) preparing an NCO prepolymer by reacting an organic polyisocyanate with an aldimine and optionally a high molecular weight polyol and/or an isocyanate-reactive compound containing hydrophilic groups, wherein the aldimine is present in an amount sufficient to incorporate 0.1 to 25% by weight, based on the weight of the polyurea, of en-urea groups (calculated as —NH—C(O)—N—, MW 57) obtained by the reaction of an isocyanate group with an aldimine group prepared from a cyclic polyamine containing (cyclo)aliphatically bound amino groups and B) reacting the NCO prepolymer with an isocyanate-reactive compound containing amino groups or either prior to, during or after dispersing the NCO prepolymer in water.

In accordance with the present invention the aqueous polyurea dispersions are preferably prepared by a two-stage process wherein an NCO prepolymer is formed in the first stage and is subsequently chain extended with an isocyanate-reactive component in the second stage to form the polyurea either before, during or after being mixed with an aqueous medium. However, any of the known one- and two-stage processes and starting materials may be used for preparing the dispersions with the only requirement being that the starting materials for the preparation of the polyurea contain an aldimine prepared from a cyclic polyamine, preferably a diamine, containing (cyclo)aliphatically bound amino groups.

Suitable polyisocyanates which may be used to prepare the polyureas are known and include organic diisocyanates represented by the formula $$R(NCO)_2$$

in which R represents an organic group obtained by removing the isocyanate groups from an organic diisocyanate having a molecular weight of from about 112 to 1,000, preferably from about 140 to 400. Diisocyanates preferred for the process according to the invention are those represented by the above formula in which R represents a divalent aliphatic hydrocarbon group having from 4 to 18 carbon atoms, a divalent cycloaliphatic hydrocarbon group having from 5 to 15 carbon atoms, a divalent araliphatic hydrocarbon group having from 7 to 15 carbon atoms or a divalent aromatic hydrocarbon group having 6 to 15 carbon atoms. Examples of suitable organic diisocyanates include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane- 1,3- and -1,4-diisocyanate, 1-isocyanato-2-isocyanatomethyl cyclopentane, 1-isocyanato-3-isocyanatomethyl-3,5,5-trimethylcyclohexane (isophorone diisocyanate or IPDI), bis-(4-isocyanatocyclohexyl)-methane, 1,3- and 1,4-bis-(isocyanatomethyl)-cyclohexane, bis-(4-isocyanatocyclohexyl)-methane, 2,4'-diisocyanato-dicyclohexyl methane, bis-(4-isocyanato-3-methyl-cyclohexyl)-methane, α,α,α',α'-tetramethyl- 1,3- and/or 1,4-xylylene diisocyanate, 1-isocyanato-1-methyl 4(3)-isocyanatomethyl cyclohexane, 2,4- and/or 2,6-hexahydrotoluylene diisocyanate, 1,3- and/or 1,4-phenylene diisocyanate, 2,4- and/or 2,6-toluylene diisocyanate, 2,4- and/or 4,4'-diphenylmethane diisocyanate and 1,5-diisocyanato naphthalene and mixtures thereof. Aromatic polyisocyanates containing 3 or more isocyanate groups such as 4,4',4"-triphenylmethane diisocyanate and polyphenyl polymethylene polyisocyanates obtained by phosgenating aniline/formaldehyde condensates may also be used. Preferred diisocyanates bis-(4-isocyanatocyclohexyl)-methane, 1,6-hexamethylene diisocyanate and isophorone diisocyanate, especially bis-(4-isocyanatocyclohexyl)-methane.

Organic compounds containing at least two isocyanate-reactive groups, which may be reacted with the previously described organic diisocyanates to prepare the NCO prepolymers, can be divided into two groups, i.e., high molecular weight compounds with molecular weights from 400 to about 6,000, preferably from 800 to about 3,000, and low molecular weight compounds with molecular weights below 400. The molecular weights are number average molecular weights ($M_n$) and are determined by end group analysis (OH number). Examples of the high molecular weight compounds are polyester polyols, polyether polyols, polyhydroxy polycarbonates, polyhydroxy polyacetals, polyhydroxy polyacrylates, polyhydroxy polyester amides and polyhydroxy polythioethers. The polyester polyols, polyether polyols and polyhydroxy polycarbonates are preferred.

Suitable polyester polyols include reaction products of polyhydric, preferably dihydric alcohols to which trihydric alcohols may be added and polybasic, preferably dibasic carboxylic acids. Instead of these polycarboxylic acids, the corresponding carboxylic acid anhydrides or polycarboxylic acid esters of lower alcohols or mixtures thereof may be used for preparing the polyesters. The polycarboxylic acids may be aliphatic, cycloaliphatic, aromatic and/or heterocyclic and they may be substituted, e.g. by halogen atoms, and/or unsaturated. The following are mentioned as examples: succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride, endomethylene tetrahydrophthalic acid anhydride; glutaric acid anhydride; maleic acid; maleic acid anhydride; fumaric acid; dimeric and trimeric fatty acids such as oleic acid, which may be mixed with monomeric fatty acids; dimethyl terephthalates and bis-glycol terephthalate. Suitable polyhydric alcohols include, e.g. ethylene glycol; propylene glycol-( 1,2) and -(1,3); butylene glycol-(1,4) and -(1,3); hexanediol-(1,6); octanediol-(1,8); neopentyl glycol; cyclohexanedimethanol (1,4-bis-hydroxymethylcyclohexane); 2-methyl- 1,3-propanediol; 2,2,4-trimethyl- 1,3-pentanediol; triethylene glycol; tetraethylene glycol; polyethylene glycol; dipropylene glycol; polypropylene glycol; dibutylene glycol and polybutylene glycol, glycerine and trimethlyolpropane. The polyesters may also contain a portion of carboxyl end groups. Polyesters of lactones, e.g. ξ-caprolactone or hydroxycarboxylic acids, e.g. ω-hydroxycaproic acid, may also be used.

Polycarbonates containing hydroxyl groups include those known per se such as the products obtained from the reaction of diols such as propanediol-(1,3), butanediol-(1,4) and/or hexanediol-(1,6), diethylene glycol, triethylene glycol or tetraethylene glycol with phosgene, diarylcarbonates such as diphenylcarbonate or with cyclic carbonates such as ethylene or propylene carbonate. Also suitable are polyester carbonates obtained from the above-mentioned polyesters or polylactones with phosgene, diaryl carbonates or cyclic carbonates.

Suitable polyether polyols are obtained in known manner by the reaction of starting compounds which contain reactive hydrogen atoms with alkylene oxides such as ethylene oxide, propylene oxide, butylene oxide, styrene oxide, tetrahydrofuran, epichlorohydrin or mixtures of these alkylene oxides. It is preferred that the polyethers do not contain more than about 10% by weight of ethylene oxide units. Most preferably, polyethers obtained without the addition of ethylene oxide are used. Suitable starting compounds containing reactive hydrogen atoms include the polyhydric alcohols set forth for preparing the polyester polyols and, in addition, water, methanol, ethanol, 1,2,6-hexane triol, 1,2,4-butane triol, trimethylol ethane, pentaerythritol, mannitol, sorbitol, methyl glycoside, sucrose, phenol, isononyl phenol, resorcinol, hydroquinone, 1,1,1- or 1,1,2-tris-(hydroxylphenyl)-ethane.

Polyethers which have been obtained by the reaction of starting compounds containing amine compounds can also be used, but are less preferred for use in the present invention. Examples of these polyethers as well as suitable polyhydroxy polyacetals, polyhydroxy polyacrylates, polyhydroxy polyester amides, polyhydroxy polyamides and polyhydroxy polythioethers are disclosed in U.S. Pat. No. 4,701,480, herein incorporated by reference.

While the presence of the previously described high molecular weight polyols is optional, they may be used in amount of at least 5%, preferably at least 10% by weight, based on the weight of the polyurea. The maximum amount of these polyols is generally 85%, preferably 75% by weight, based on the weight of the polyurea.

The low molecular weight isocyanate-reactive component having an average molecular weight of up to 400 are selected from aldimines and optionally the polyhydric alcohols, preferably dihydric alcohols, which have previously been described for the preparation of the polyester polyols and polyether polyols. The aldimines are used in amounts sufficient to incorporate at least 0.1%, preferably at least 0.5% and more preferably at least 1.0%, based on the weight of the polyurea of structural units corresponding to the formula, NH—C(O)—N— (MW 57). The aldimines are used in amounts sufficient to incorporate a maximum amount of 25%, preferably 15% and more preferably 10%, based on the weight of the polyurea of structural units corresponding to the formula, NH—C(O)—N—(MW 57).

Suitable aldimines for use in combination with the polyisocyanate mixtures include those prepared from an aldehyde and cyclic polyamines containing two or more, preferably 2, (cyclo)aliphatically bound primary amino groups. Suitable polyamines include 1-amino-3-aminomethyl- 3,5,5-trimethyl cyclohexane, bis-(4-aminocyclohexyl)-methane, bis-(4-amino- 3-methylcyclohexyl)-methane, 1,2- and/or 1,4-cyclohexane diamine, 1,3-bis-(aminomethyl)-cyclohexane, 1,8-p-menthane diamine, 1-amino- 2-aminomethyl cyclopentane, xylylene diamine, α,α,α',α'-tetramethyl- 1,3- and/or-1,4-xylylene diamine, 1-amino-1-methyl-4(3)-aminomethyl cyclohexane, and 2,4- and/or 2,6-hexahydrotoluylene diamine.

Suitable aldehydes are those corresponding to the formula

O=CHCH(R₁)(R₂)

wherein

R₁ and R₂ may be the same or different and represent optionally substituted hydrocarbon radicals, preferably containing 1 to 10, more preferably 1 to 6, carbon atoms, or R₁ and R₂ together with the β-carbon atom form a cycloaliphatic or heterocyclic ring.

Examples of suitable aldehydes include isobutyraldehyde, 2-ethyl hexanal, 2-methyl butyraldehyde, 2-ethyl butyraldehyde, 2-methyl valeraldehyde, 2,3-dimethyl valeraldehyde, 2-methyl undecanal and cyclohexane carboxaldehyde. Preferred aldehydes are isobutyraldehyde and 2-ethyl hexanal, especially isobutyraldehyde.

The aldimines may be prepared in known manner by reacting the polyamines with the aldehydes either in stoichiometric amounts or with an excess of aldehyde. The excess aldehyde and the water which is produced can be removed by distillation. The reactions may also be carried out in solvents, other than ketones. The solvents may also be removed by distillation after completion of the reaction.

In addition to the above-mentioned components which are preferably difunctional in the isocyanate polyaddition reaction, monofunctional and even small portions of trifunctional and higher functional components generally known in polyurethane chemistry, such as trimethylolpropane, may be used in special cases in which slight branching of the NCO prepolymer or polyurea is desired. However, the NCO prepolymers should be substantially linear and this may be achieved by maintaining the average functionality of the prepolymer starting components below about 2.1.

In order to enable the polyurea to be stably dispersed in an aqueous medium, ionic or potential ionic groups and/or lateral or terminal, hydrophilic ethylene oxide units are chemically incorporated into the polyurea. The ionic or potential ionic groups may be either anionic or cationic, preferably anionic. Examples of anionic groups include carboxylate and sulfonate groups, while examples of cationic groups include ammonium and sulfonium groups. The ionic groups are incorporated in an amount sufficient to provide an ionic group content of 0 to 200 milliequivalents per 100 g of polyurea. When the ionic or potential ionic groups are incorporated, they are preferably incorporated in an amount sufficient to provide an ionic group content of at least 10, preferably at least 20 milliequivalents per 100 g of polyurea. The upper limit for the content of ionic groups is preferably 180, more preferably 100 milliequivalents per 100 g of polyurea.

The content of hydrophilic ethylene oxide units may be up to about 10%, preferably up to about 8%, more preferably about 1 to 6% and most preferably about 2 to 6%, by weight, based on the weight of the polyurea. In addition, up to about 75% of the allowable, chemically incorporated, hydrophilic ethylene oxide units may be replaced by the known nonionic, external emulsifiers such as those of the alkaryl type such as polyoxyethylene nonyl phenyl ether or polyoxyethylene octyl phenyl ether; those of the alkyl ether type such as polyoxyethylene lauryl ether or polyoxyethylene oleyl ether; those of the alkyl ester type such as polyoxyethylene laurate, polyoxyethylene oleate or polyoxyethylene stearate; and those of the polyoxyethylene benzylated phenyl ether type.

The ionic or potential ionic groups may be chemically incorporated into the NCO prepolymer or may be chemically incorporated through the chain extender which is used to form the polyurea from the prepolymer. Suitable compounds for incorporating these groups include i) monoisocyanates or diisocyanates which contain ionic or potential ionic groups and ii) compounds which are monofunctional or difunctional in the isocyanate-polyaddition reaction and contain ionic or potential ionic groups.

The ionic groups are formed by neutralizing the corresponding potential ionic groups either prior to, during or after formation of the polyurea. When the potential ionic groups are neutralized prior to their incorporation into the polyurea, the ionic groups are incorporated directly. When neutralization is performed subsequent to forming the polyurea, potential ionic groups are incorporated.

Suitable compounds for incorporating the carboxylate, sulfonate and quaternary nitrogen groups are described in U.S. Pat. No. 3,479,310, 4,108,814 and 4,303,774, the disclosures of which are herein incorporated by reference. Suitable compounds for incorporating tertiary sulfonium groups are described in U.S. Pat. No. 3,419,533, also incorporated by reference. The preferred sulfonate groups for incorporation into the NCO prepolymer are the diol sulfonic acids or the diol sulfonates disclosed in U.S. Pat. No. 4,108,814.

The neutralizing agents for converting the potential ionic groups to ionic groups are described in the preceding U.S. Patents and are also discussed hereinafter. Within the context of this invention, the term "neutralizing agents" is meant to embrace all types of agents which are useful for converting potential ionic groups to ionic groups.

The preferred carboxylate groups for incorporation into polyurea in either the one-stage or two-stage process are derived from hydroxy-carboxylic acids of the general formula:

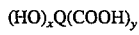

wherein

Q represents a straight or branched, hydrocarbon radical containing 1 to 12 carbon atoms, and x and y represent values from 1 to 3.

Examples of these hydroxy-carboxylic acids include citric acid and tartaric acid.

The preferred acids are those of the above-mentioned formula wherein x=2 and y=1. These dihydroxy alkanoic acids are described in U.S. Pat. No. 3,412,054, herein incorporated by reference. The preferred group of dihydroxy alkanoic acids are the α,α-dimethylol alkanoic acids represented by the structural formula

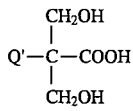

wherein Q' is hydrogen or an alkyl group containing 1 to 8 carbon atoms. The most preferred compound is α,α-dimethylol propionic acid, i.e., when Q' is methyl in the above formula.

When incorporating the anionic or potential anionic groups through the chain extender used to convert the NCO prepolymer to the polyurea in the second stage of the two-stage process, it is preferred to use amino functional compounds containing anionic or potential anionic groups such as the diamino carboxylic acids or carboxylates disclosed in U.S. Pat. No. 3,539,483 or salts of 2,6-diaminohexanoic acid. When sulfonate groups are desired they may be incorporated through the chain extenders using salts of isethionic acid or preferably diamino sulfonates of the formula

wherein

A and B represent aliphatic hydrocarbon radicals containing 2 to 6 carbon atoms, preferably ethylene groups.

Whether the anionic groups are incorporated into the polyurea via the prepolymer or the chain extender is not critical. Therefore, the anionic groups may exclusively be incorporated via the prepolymer or via the chain extender or a portion of the anionic groups may be introduced according to each alternative. However, it is preferred to introduce the anionic groups via the prepolymer since this allows a wider range of process variations in preparing the polyurea dispersion.

Suitable compounds for incorporating the lateral or terminal, hydrophilic ethylene oxide units may be either monofunctional or difunctional in the context of the isocyanate-polyaddition reaction and include i) diisocyanates which contain lateral, hydrophilic ethylene oxide units, ii) compounds which are difunctional in the isocyanate-polyaddition reaction and contain lateral, hydrophilic ethylene oxide units, iii) monoisocyanates which contain terminal, hydrophilic ethylene oxide units, iv) compounds which are monofunctional in the isocyanate-polyaddition reaction and contain terminal, hydrophilic ethylene oxide units, and v) mixtures thereof.

Examples of these compounds are disclosed in U.S. Pat. Nos. 3,905,929, 3,920,598 and 4,190,566 (the disclosures of which are herein incorporated by reference). Preferred hydrophilic components are the monohydroxy polyethers having terminal hydrophilic chains containing ethylene oxide units. These hydrophilic components may be produced as described in the preceding patents by alkoxylating a monofunctional starter, such as methanol or n-butanol, using ethylene oxide and optionally another alkylene oxide, for example propylene oxide.

In the two-stage process the NCO prepolymers of the present invention are prepared by reacting the polyisocyanate component an aldimine and optionally the high molecular weight organic component containing at least 2 isocyanate-reactive groups and/or the low molecular weight organic component containing at least 2 isocyanate-reactive groups. Optional low molecular weight components include the component containing at least one ionic group or at least one potential ionic group and the component containing the hydrophilic ethylene oxide units. The ratio of isocyanate groups to isocyanate-reactive groups is maintained between about 1.1 to 5, preferably about 1.2 to 3 and most preferably about 1.3 to 2.0 on an equivalent basis. The above components may be reacted simultaneously or sequentially to produce the NCO prepolymer.

The reaction temperature during prepolymer production is normally maintained below about 150° C., preferably between about 50° and 130° C. The reaction is continued until the content of unreacted isocyanate groups decreases to the theoretical amount or slightly below. The finished prepolymer should have a free isocyanate content of about 1 to 20%, preferably about 1 to 10% by weight, based on the weight of prepolymer solids.

The prepolymers may be prepared in the presence of solvent provided that the solvent is substantially nonreactive in the context of the isocyanate-polyaddition reaction. Examples of suitable solvents include dimethylformamide, esters, ethers, ketoesters, ketones, e.g., methyl ethyl ketone and acetone, glycol-ether-esters, chlorinated hydrocarbons, aliphatic and alicyclic hydrocarbon-substituted pyrrolidinones, e.g., N-methyl- 2-pyrrolidinone, hydrogenated furans, aromatic hydrocarbons and mixtures thereof.

Suitable neutralizing or quaternizing agents for converting the potential anionic groups to anionic groups either before, during or after their incorporation into the polyureas, are tertiary amines, alkali metal cations or ammonia. Examples of these neutralizing agents are disclosed in U.S. Pat. Nos. 4,501,852 and 4,701,480, which are incorporated by reference. Preferred neutralizing agents are the trialkyl-substituted tertiary amines and include triethyl amine, N,N-dimethyl-ethanol amine, triethanol amine and N-methyl-diethanol amine.

A sufficient amount of the potential ionic groups must be neutralized so that when combined with the hydrophilic ethylene oxide units and optional external emulsifiers, the polyurea final product will be a stable dispersion. Generally, at least about 75%, preferably at least about 90%, of the potential ionic groups are neutralized to the corresponding ionic groups.

The conversion of the potential ionic groups to ionic groups is conducted in known manner, e.g., as described in the preceding patents setting forth suitable neutralizing agents.

The NCO prepolymers may be converted into aqueous polyurea dispersions in accordance with the methods known in polyurethane chemistry and described, e.g., in "Waterborne Polyurethanes," Rosthauser et al, Advances in Urethane Science and Technology, Vol. 10, pg. 121–162 (1987).

According to one process for preparing the polyurea dispersions, the NCO prepolymer is prepared, chain extended to form a polyurea and subsequently dispersed in water. This process is disclosed in U.S. Pat. No. 3,479,310, herein incorporated by reference. When aldimines are used as the chain extender or as a portion of the chain extender, it is preferred that the polyurea dispersions are prepared in this manner.

However, since amines are preferably used as the chain extender, the preferred method of conducting the chain extension of the NCO prepolymer is by dispersing the prepolymer in water and subsequently adding the chain extender. Whether linear or cross-linked polyurea dispersions are obtained generally depends on the functionality of the chain extender.

The aqueous polyurea dispersions of the present invention are formed by reacting the isocyanate-terminated prepolymers with an aldimine, a polyamine or mixtures thereof in accordance with thee previously described processes. The average functionality of the amine, i.e., the number of amine nitrogens per molecule, should be between about 2 and 6, preferably between about 2 and 4 and most preferably between about 2 and 3. The desired functionalities can be obtained by using mixtures of polyamines. Examples of suitable aldimines and their functionalities have previously been set forth.

Suitable amines are essentially hydrocarbon polyamines containing 2 to 6 amine groups which have isocyanate-reactive hydrogens according to the Zerewitinoff test, e.g., primary or secondary amine groups. The polyamines are generally aromatic, aliphatic or alicyclic amines and contain between about 1 to 30 carbon atoms, preferably about 2 to 15 carbon atoms, and most preferably about 2 to 10 carbon atoms. These polyamines may contain additional substitutents provided that they are not as reactive with isocyanate groups as the primary or secondary amines.

Examples of polyamines for use in the present invention include the cyclic diamines previously disclosed as starting materials for preparing the low molecular weight aldimines, and also ethylene diamine, 1,6-hexane diamine, 1,2- and 1,3- propylene diamine, the isomeric butylene diamines, hydrazine, diethylene triamine, triethylene tetramine, tetraethylene pentamine, pentaethylene hexamine, N,N,N-tris-(2-aminoethyl)-amine, N,N,N'-tris-(2-aminoethyl)-ethylene diamine, N-(2-aminoethyl)- 1,3-propane diamine, polyoxypropylene amines, tetrapropylenepentamine, tripropylenetetramine, N,N-bis-(6-amino-hexyl)amine, N,N'-bis( 3-aminopropyl)-ethylene diamine and 2,4-bis-(4'-aminobenzyl)-aniline.

Preferred polyamines are 1-amino-3-aminomethyl-3,5,5-trimethyl-cyclohexane (isophorone diamine or IPDA), bis-(4-aminocyclohexyl)-methane, bis-(4-amino-3-methylcyclohexyl)-methane, 1,6diaminohexane, ethylene diamine, diethylene triamine, triethylene tetramine, tetraethylene pentamine and pentaethylene hexamine.

The amount of chain extender to be used in accordance with the present invention is dependent upon the number of terminal isocyanate groups in the prepolymer. Generally, the ratio of terminal isocyanate groups of the prepolymer to isocyanate-reactive groups of the chain extender, preferably the amino hydrogens of the polyfunctional amine, is between about 1.0:0.6 and 1.0:1.1, preferably between about 1.0:0.8 and 1.0:0.98 on an equivalent basis.

The reaction between the NCO prepolymer and the chain extender is generally conducted at temperatures from about 5° to 90° C., preferably from about 20° to 80° C., and most preferably from about 30° to 60° C. The reaction conditions are normally maintained until the isocyanate groups are essentially completely reacted.

The final product is a stable, aqueous dispersion of polyurea particles having a solids content of up to about 60% by weight, preferably about 15–60% by weight and most preferably about 30–45% by weight. However, it is always possible to dilute the dispersions to any minimum solids content desired. The particle size is generally below about 1.0 micron, and preferably between about 0.001 to 0.5 microns. The average particle size should be less than about 0.5 micron, and preferably between 0.01 to 0.3 microns. The small particle size enhances the stability of the dispersed particles and also leads to the production of films with high surface gloss.

The dispersions may be blended with other dispersions or with other known additives such as fillers, plasticizers, pigments, carbon black, silica sols and the known levelling agents, wetting agents, antifoaming agents and stabilizers.

The aqueous polyurea dispersions are suitable for coating and impregnating woven and nonwoven textiles, leather, paper, wood, metals, ceramics, stone, concrete, bitumen, hard fibers, straw, glass, porcelain, plastics of a variety of different types, glass fibers for antistatic and crease-resistant finishing; as binders for nonwovens, adhesives, adhesion promoters, laminating agents, hydrophobizing agents, plasticizers; as binders, for example, for cork powder or sawdust, glass fibers, asbestos, paper-like materials, plastics or rubber waste, ceramic materials; as auxiliaries in textile printing and in the paper industry; as additives to polymers as sizing agents, for example, for glass fibers; and for finishing leather.

Drying of the products obtained by various application techniques may be carried out either at room temperature or at elevated temperature.

In the following examples all parts and percentages are by weight unless otherwise specified.

EXAMPLES

Comparison Example 1

An NCO prepolymer was prepared from the following charge:

| Parts | Charge |
| --- | --- |
| 111.5 | 1,6-hexanediol adipate avg. MW 840 |
| 5.0 | monofunctional ethylene oxide ether*, MW 2150 |
| 13.8 | neopentyl glycol (NPG) |
| 11.1 | dimethylol propionic acid (DMPA) |
| 91.8 | N-methyl-2-pyrrolidinone (NMP) |
| 137.3 | bis-(4-isocyanatocyclohexyl)-methane |
| 8.3 | triethylamine (TEA) |
| 5.0 | monofunctional ethylene oxide ether*, MW 2150 |
| 41.7 | NMP |

*A polyether monohydric alcohol prepared from n-butanol, ethylene oxide, and propylene oxide (in a molar ratio ethylene oxide to propylene oxide of 83:17).

The 1,6-hexanediol adipate, 5.0 parts of the monofunctional polyether, NPG, DMPA and 91.8 parts of NMP were charged into a 1 liter, 3 neck flask equipped with a thermometer, condenser with drying tube, and stirrer with a 3 inch blade. While stirring the mixture was heated to 70° C., and the bis-(4-isocyanatocyclohexyl)-methane was added. The components were heated to 100° C. and stirred for 3 hours forming an NCO prepolymer having an NCO content of 3.86% (theoretical NCO 0- 3.9%). The prepolymer was cooled to 70° C., then a neutralizing mixture of TEA, 5.0 parts of the monofunctional polyether, and 41.7 parts of NMP was added and stirred 10 minutes while the temperature was maintained at 70° C.

While stirring rapidly, 398.1 parts of the neutralized prepolymer (70° C.) was transferred over a 10 minute period into a 2 liter resin flask (equipped with two turbine type stirring blades) containing 329.7 parts of demineralized water (DMW).

An amine solution made up of 2.2 parts of ethylene diamine (EDA), 2.0 parts of diethylene triamine (DETA), and 2.9 parts of hydrazine hydrate, and 40.4 parts DMW was added over a 5 minute period to the dispersion. The resulting aqueous polyurea dispersion was heated to 70° C. for 3 hours to react off any remaining free isocyanate groups. The resulting product was a stable, fine particle size, polyurea dispersion.

| Total solids | 34.6% |
|---|---|
| Viscosity | 90 mPa · s at 23° C. |
| pH | 8.5 |

Examples 1–6 and Comparison Examples 2–3

The examples according to the invention and Comparison Examples 2 and 3 were prepared by repeating Comparison Example 1 with the exception that NPG was replaced on an equivalent basis in the formulation with an aldimine. In Examples 1–6 according to the invention the aldimines were prepared from a cyclic diamine containing (cyclo)aliphatically amino groups and isobutyraldehyde. In Comparison Examples 2 and 3 the aldimines were prepared from an amino-terminated polyether (Jeffamine D-230 resin, available from Huntsman) and 2-methyl-1,5opentane diamine, respectively. The diamines used to prepare the aldimines and the characteristics of the resulting polyurea dispersions are set forth in the following table.

| Ex. | Diamine | Aldimine Wt. (g) | Water Wt. (g) | Prepol. Wt. (g) | Prepol. % NCO | pH of Dispersion | Viscosity of Dispersion (cps) | En-urea Content (%) |
|---|---|---|---|---|---|---|---|---|
| 1 | Isophorone Diamine | 35.7 | 363.3 | 14.0 | 3.60 | 8.3 | 40 | 4.6 |
| 2 | Bis-4-aminocyclohexyl)-methane | 38.0 | 371.1 | 415.8 | 3.30 | 8.3 | 90 | 4.3 |
| 3 | Bis-(3-methyl-4-aminocyclohexyl)-methane | 41.0 | 363.3 | 413.0 | 3.57 | 8.4 | 65 | 4.2 |
| 4 | 1,3-Bis-(amino methyl)-cyclohexane | 32.3 | 359.5 | 398.8 | 3.80 | 8.9 | 275 | 4.8 |
| 5 | Meta-xylylenediamine | 31.7 | 345.8 | 398.2 | 3.78 | 8.2 | 140 | 4.8 |
| 6 | 1,8-p-diaminomethane | 35.7 | 352.5 | 403.0 | 3.53 | 8.7 | 20 | 4.7 |
| Comp Ex. 2 | Jeffamine D-230 resin | 40.0 | 361.8 | 423.8 | 3.42 | 8.4 | 115 | 4.3 |
| Comp Ex. 3 | 2-methyl-1,5-pentane diamine | 38.0 | 345.8 | 395.2 | 3.71 | 9.1 | 295 | 4.9 |

Coatings were prepared from the dispersions of the Comparison Examples 1–3 and Examples 1–6 by drawing them down onto Bonderite steel panels at a 5 mil wet film thickness. One set of films was cured at ambient temperature for one week, and another set was dried for 30 minutes at ambient temperature, then cured in a 140° C. oven for 10 minutes. Properties of the resulting coatings are set forth below.

| Example # | Pendulum Hardness[1] Ambient Temp. cure for 1 wk. (sec) | Pendulum Hardness[1] Cured at 140° C. for 10 min. (sec) | MEK 2X Rubs[2] Ambient Temp. Cure for 1 wk. | MEK 2X Rubs[2] Cured at 140° C. for 10 min. |
|---|---|---|---|---|
| 1 | 187 | 122 | 170 | 200+ |
| 2 | 155 | 134 | 180 | 200+ |
| 3 | 176 | 136 | 200+ | 200+ |
| 4 | NA | 129 | NA | 200+ |
| 5 | 154 | 112 | 200+ | 200+ |
| 6 | 183 | 137 | 200+ | 200+ |
| Comp Ex 1 | 109 | 83 | 140 | 170 |
| Comp Ex 2 | 136 | 111 | 80 | 200+ |
| Comp Ex 3 | 146 | 105 | 130 | 200+ |

[1]ASTM D-4366, Method A, Konig Pendulum Hardness
[2]Value represents number of double rubs to remove the film from the substrate using a cotton ball soaked in methyl ethyl ketone The examples demonstrate the improvements in hardness and solvent resistance that are obtained by preparing coatings from the aldimine-containing polyureas according to the invention. The comparison examples, which are identical to the examples according to the invention except for the use of alcohols or aliphatic aldimines instead of cyclic aldimines, did not possess the combination of hardness and solvent resistance obtained from the coatings according to the invention.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous polyurea dispersion wherein the polyureas contain 0.5 to 25% by weight, based on the weight of the polyureas, of en-urea groups (calculated as —NH—C(O)—N—, MW 57) obtained by the reaction of an isocyanate group with an aldimine group prepared from a cyclic polyamine containing (cyclo)aliphatically bound amino groups.

2. The dispersion of claim 1 wherein said polyureas contain 10 to 120 milliequivalents per 100 grams of polyureas of chemically incorporated anionic groups and up to about 10% by weight, based on the weight of said polyureas, of lateral and/or terminal hydrophilic chains containing ethylene oxide units.

3. The dispersion of claim 2 wherein at least about 80% of said anionic groups are carboxylate groups neutralized with tertiary amines.

4. An aqueous polyurea dispersion wherein the polyureas are based on the reaction product of a) an NCO prepolymer containing 0.5 to 25% by weight, based on the weight of the polyurea, of en-urea groups (calculated as —NH—C(O)—N—, MW 57) obtained by the reaction of an isocyanate group with an aldimine group prepared from a cyclic polyamine containing (cyclo)aliphatically bound amino groups with b) an isocyanate-reactive component containing amino groups.

5. The dispersion of claim 4 wherein said polyureas contain 10 to 120 milliequivalents per 100 grams of polyureas of chemically incorporated anionic groups and up to about 10% by weight, based on the weight of said polyureas, of lateral and/or terminal hydrophilic chains containing ethylene oxide units.

6. The dispersion of claim 5 wherein at least about 80% of said anionic groups are carboxylate groups neutralized with tertiary amines.

7. A process for preparing an aqueous polyurea dispersion which comprises

A) preparing an NCO prepolymer by reacting an organic polyisocyanate with an aldimine and/or a high molecular weight polyol and optionally an isocyanate-reactive compound containing hydrophilic groups and B) reacting the NCO prepolymer with an aldimine or an isocyanate-reactive compound containing amino groups either prior to, during or after dispersing the NCO prepolymer in water, wherein the aldimine is present in an amount sufficient to incorporate 0.5 to 25% by weight, based on the weight of the polyurea, of en-urea groups (calculated as —NH—C(O)—N—, MW 57) obtained by the reaction of an isocyanate group with an aldimine group prepared from a cyclic polyamine containing (cyclo)aliphatically bound amino groups 8. The process of claim 7 wherein the isocyanate-reactive compound containing hydrophilic groups is present in an amount such that said polyureas contain 10 to 120 milliequivalents, per 100 grams of polyureas, of chemically incorporated anionic groups and up to about 10% by weight, based on the weight of said polyureas, of lateral and/or terminal hydrophilic chains containing ethylene oxide units.

9. The process of claim 8 wherein at least about 80% of said anionic groups are carboxylate groups neutralized with tertiary amines.

10. The process of claim 7 wherein said aldimine is prepared from a cyclic diamine containing (cyclo)aliphatically bound amino groups.

11. The process of claim 8 wherein said aldimine is prepared from a cyclic diamine containing (cyclo)aliphatically bound amino groups.

12. The process of claim 9 wherein said aldimine is prepared from a cyclic diamine containing (cyclo)aliphatically bound amino groups.

13. A process for preparing an aqueous polyurea dispersion which comprises

A) preparing an NCO prepolymer by reacting an organic polyisocyanate with an aldimine and optionally a high molecular weight polyol and/or an isocyanate-reactive compound containing hydrophilic groups, wherein the aldimine is present in an amount sufficient to incorporate 0.5 to 25% by weight, based on the weight of the polyurea, of en-urea groups (calculated as —NH—C(O)—N—, MW 57) obtained by the reaction of an isocyanate group with an aldimine group prepared from a cyclic polyamine containing (cyclo)aliphatically bound amino groups and B) reacting the NCO prepolymer with an isocyanate-reactive compound containing amino groups or either prior to, during or after dispersing the NCO prepolymer in water.

14. The process of claim 13 wherein the isocyanate-reactive compound containing hydrophilic groups is present in an amount such that said polyureas contain 10 to 120 milliequivalents, per 100 grams of polyureas, of chemically incorporated anionic groups and up to about by weight, based on the weight of said polyureas, of lateral and/or terminal hydrophilic chains containing ethylene oxide units.

15. The process of claim 14 wherein at least about 80% of said anionic groups are carboxylate groups neutralized with tertiary amines.

16. The process of claim 13 wherein said aldimine is prepared from a cyclic diamine containing (cyclo)aliphatically bound amino groups.

17. The process of claim 14 wherein said aldimine is prepared from a cyclic diamine containing (cyclo)aliphatically bound amino groups.

18. The process of claim 15 wherein said aldimine is prepared from a cyclic diamine containing (cyclo)aliphatically bound amino groups.

19. The dispersion of claim 1 wherein the polyureas contain at least 1.0% by weight, based on the weight of the polyureas, of en-urea groups.

20. The dispersion of claim 4 wherein the polyureas contain at least 1.0% by weight, based on the weight of the polyureas, of en-urea groups.

21. The process of claim 7 wherein the polyureas contain at least 1.0% by weight, based on the weight of the polyureas, of en-urea groups.

22. The process of claim 13 wherein the polyureas contain at least 1.0% by weight, based on the weight of the polyureas, of en-urea groups.

* * * * *